(12) United States Patent
Higuchi et al.

(10) Patent No.: US 7,941,230 B1
(45) Date of Patent: May 10, 2011

(54) CONTROL APPARATUS AND CONTROL METHOD, NETWORK SYSTEM, PROGRAM FOR CONTROL APPARATUS, AND INFORMATION RECORDING MEDIUM

(75) Inventors: Masao Higuchi, Saitama (JP);
Ryuichiro Morioka, Saitama (JP);
Gaku Yamamura, Tokyo (JP)

(73) Assignee: Pioneer Corporation, Tokyo (JP)

( * ) Notice: Subject to any disclaimer, the term of this patent is extended or adjusted under 35 U.S.C. 154(b) by 469 days.

(21) Appl. No.: 11/847,210

(22) Filed: Aug. 29, 2007

Related U.S. Application Data

(63) Continuation of application No. PCT/JP2006/303848, filed on Mar. 1, 2006.

(30) Foreign Application Priority Data

Mar. 1, 2005  (JP) .................................. 2005-055454

(51) Int. Cl.
*G05B 19/18* (2006.01)
(52) U.S. Cl. .......................................................... 700/3
(58) Field of Classification Search .................. 700/2, 3, 700/5, 19
See application file for complete search history.

(56) References Cited

U.S. PATENT DOCUMENTS

| 5,175,861 A * | 12/1992 | Hara et al. .................... 710/200 |
| 2004/0172448 A1 * | 9/2004 | Kobayashi et al. ........... 709/203 |

FOREIGN PATENT DOCUMENTS

| JP | 2001-053766 | | 2/2001 |
| JP | 2001-188727 | A | 7/2001 |
| JP | 2002-010374 | A | 1/2002 |
| JP | 2002-024197 | A | 1/2002 |
| JP | 2002-374268 | A | 12/2002 |
| JP | 2003-116181 | | 4/2003 |

* cited by examiner

*Primary Examiner* — Albert Decady
*Assistant Examiner* — Chad Rapp
(74) *Attorney, Agent, or Firm* — Ladas & Parry, LLP

(57) ABSTRACT

The present invention provides a control apparatus and the like capable of performing exclusive control in a network without adding a new configuration to an existing apparatus to be controlled and, even in the case where the apparatus to be controlled or the like drops from the network, capable of maintaining and continuing the original exclusive control state.

In a bus system S in which an apparatus C to be controlled and a control apparatus CC are exclusively associated with each other and the operation of one apparatus C to be controlled is controlled by one control apparatus CC, exclusive control information indicating correspondence between operation of each of the apparatuses C to be controlled and a control apparatus CC which controls the operation is stored similarly in all of the control apparatuses CC with respect to each of the apparatuses to be controlled. The operation in any of the apparatuses C to be controlled is controlled by the control apparatus CC on the basis of the stored exclusive control information.

8 Claims, 9 Drawing Sheets

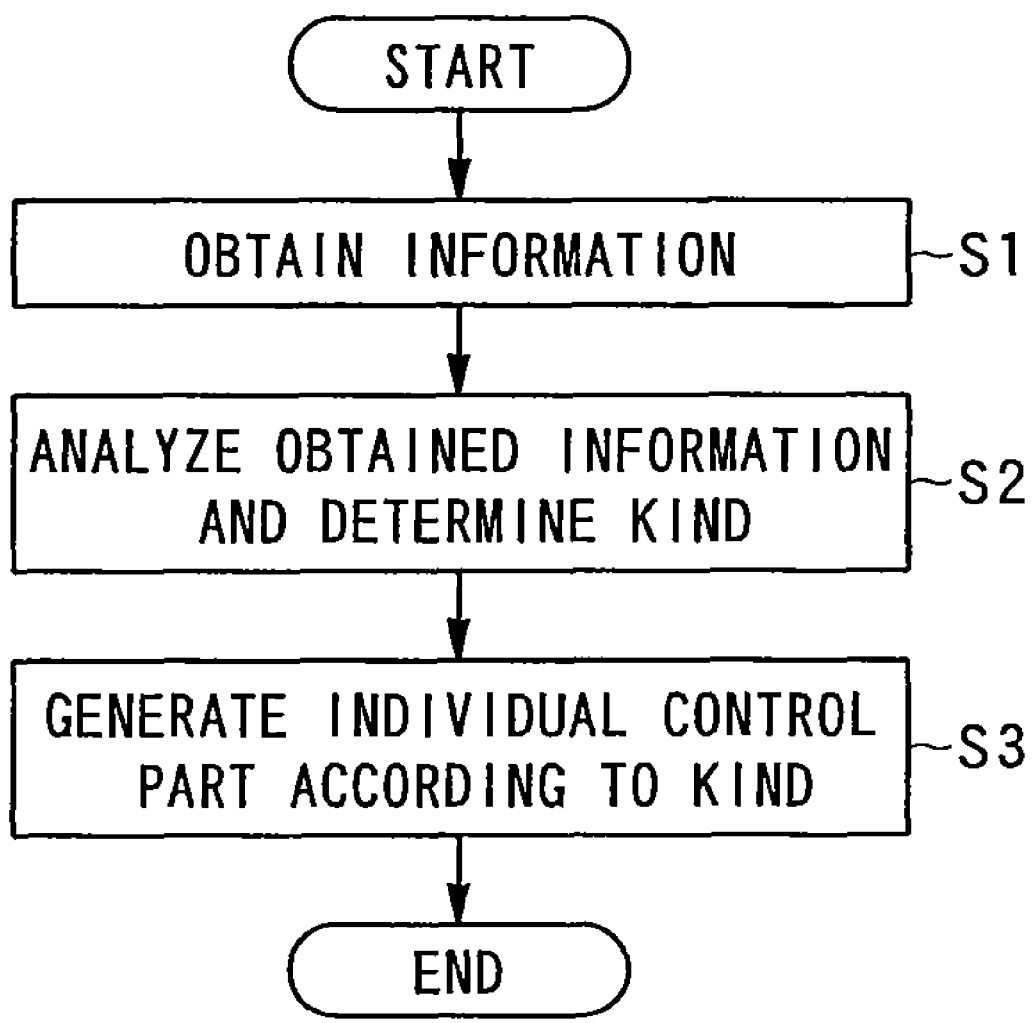

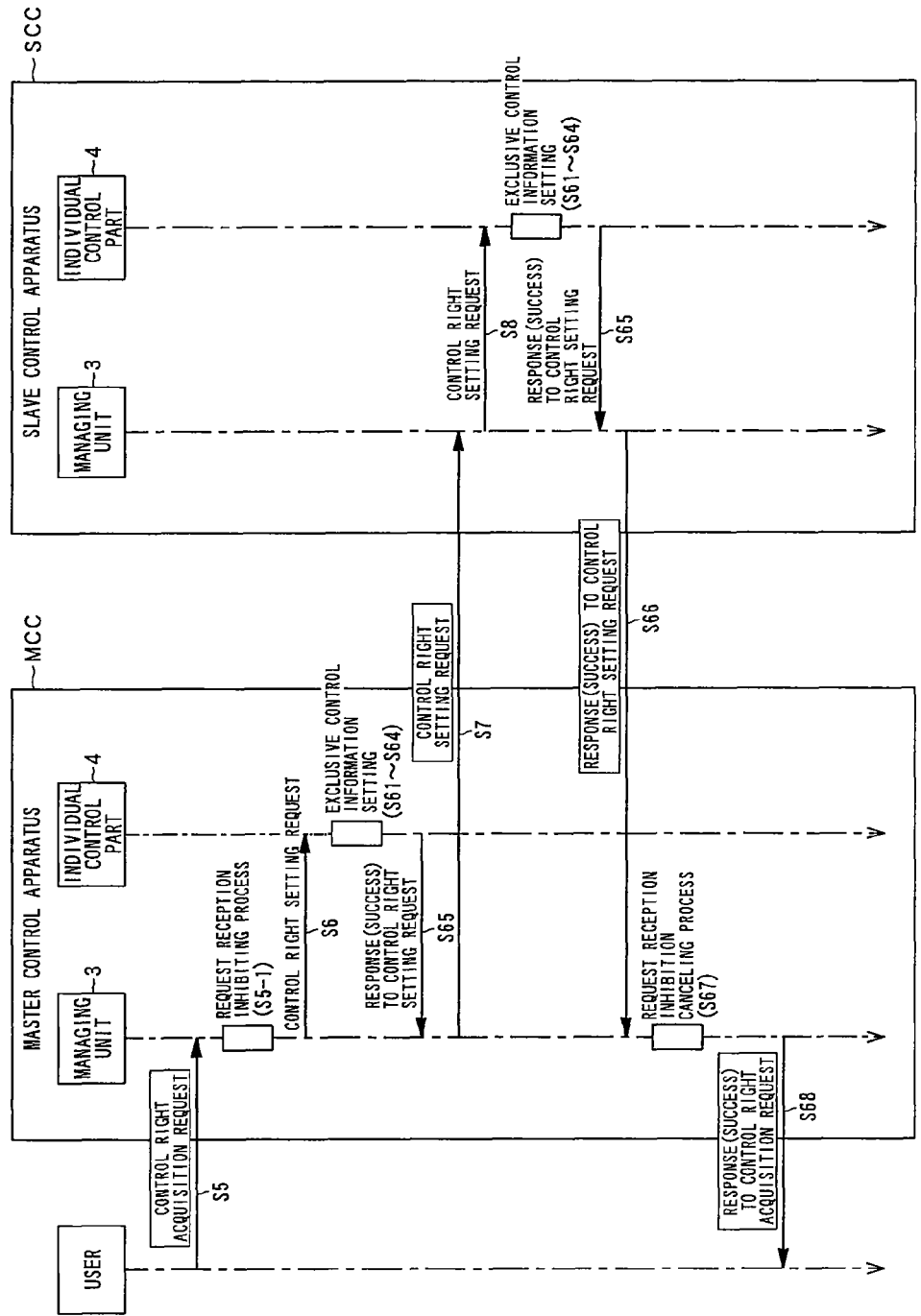

CONTROL APPARATUS AND CONTROL METHOD, NETWORK SYSTEM, PROGRAM FOR CONTROL APPARATUS, AND INFORMATION RECORDING MEDIUM

CROSS-REFERENCE TO RELATED APPLICATION

This application is the continuation of International Patent Application No. PCT/JP2006/303848 filed on Mar. 1, 2006 which claims priority to Japanese Patent Application No. 2005-055454 Filed on Mar. 1, 2005, the disclosures of which are incorporated herein by reference in its entirety.

TECHNICAL FIELD

The present invention belongs to the technical field of a control apparatus and a control method, a network system, a program for a control apparatus, and an information recording medium. More particularly, the invention belongs to the technical field of a control apparatus for controlling, for example, operation of an apparatus to be controlled which is connected to a bus by transmitting/receiving information via the serial bus, a network system including the control apparatus, a control method in the control apparatus, a program for the control apparatus, and an information recording medium on which the program for the control apparatus is recorded.

BACKGROUND ART

In recent years, products conformed with a standard for easily connecting various external devices to a personal computer by wire, for example, the USB (Universal Serial Bus) standard, the IEEE1394 (IEEE (Institute of Electrical and Electronics Engineers) 1394-1995 standard for High Performance Serial Bus) standard are widely generalized. In particular, products conformed with the IEEE1394 standard are generalized as the standard suitable for connecting sound/video devices or a sound/video device and a personal computer by wire. The operation of information reproduction, information recording, or the like in an apparatus to be controlled such as the sound/video device can be also controlled remotely using a control apparatus such as a personal computer connected according to the IEEE1394 standard. As an association for establishing and spreading a common standard to be adhered in the control operation, so-called 1394TA (1394 Trade Association, http://www.1394ta.org/) is established.

An AV/C (Audio Visual/Control) command is used as a control information (command) transmitted/received between the apparatus to be controlled and the control apparatus at the time of controlling the operation of the apparatus to be controlled by the control apparatus. The specification of the AV/C command is standardized by the 1394TA. More concretely, as one of standards determining the specifications of the AV/C command, "TA Document 2001012, AV/C Digital Interface Command Set General Specification Version 4.1" has been announced by the 1394TA. As a part related to the present invention in the standard, in section 11.4, a reserve command is defined as a command for exclusively controlling an apparatus to be controlled only by one control apparatus while excluding the other control apparatuses. According to the standard, specifically, when an apparatus to be controlled to which the reserve command can be applied receives the reserve command from a control apparatus connected to a network conformed with IEEE1394, the apparatus to be controlled recognizes apparatus identification information (generally called GUID (Global Unique ID) which is identification information unique to the control apparatus all over the world) of a control apparatus which outputted the reserve command and, after that, performs an operation written in a control command from the control apparatus whose apparatus identification information was recognized preferentially over operations written in control commands from other control apparatuses.

One of the conventional techniques related to control of an apparatus to be controlled using the reserve command (hereinafter, called a first conventional technique) is an exclusive control method disclosed in Japanese Unexamined Patent Application Publication No. 2001-53766.

There is also HAVi (Home Audio Video interoperability, http://www.havi.org/) as a group for promoting interoperability and standardization of connection of a plurality of information processors using networks including the IEEE1394 standard.

One of the specifications standardized by HAVi is a HAVi specification (full name is "HAVi specification Version 1.1"). In section 3.5 (device control) of the specification, the concept of "DCM (Device Control Modules)" is written as a method of controlling the operation of an apparatus to be controlled from a control apparatus in the network. In section 3.8 (resource manager), a mechanism for exclusively controlling an apparatus to be controlled in the HAVi specification is written.

Specifically, the DCM is a software module as the concept unique to HAVi defining API (Application Program Interface), in which apparatuses to be controlled which are connected to a network are abstracted and operations of them are controlled by a control apparatus in a remote place. In the DCM, as API for exclusively controlling an apparatus to be controlled, the concepts of "reserve (reserve of a control right indicative of exclusive control on the apparatus to be controlled)" and "release (release of the control right)" are defined. The DCM is provided only for a single control apparatus selected from control apparatuses existing on a serial bus conformed with the 1394 standard same as that of the apparatus to be controlled.

The concept of the DCM also permits the case where exclusive control information (to be specific, exclusive control information showing correspondence between an apparatus to be controlled and a control apparatus exclusively controlling the apparatus to be controlled) is stored in an apparatus to be controlled. However, when the apparatus to be controlled itself is an apparatus which is not adapted to an operation based on the exclusive control information, the corresponding exclusive control information is stored in the control apparatus.

In the HAVi specification, only the concepts of "reserve" and "release" are defined as API in the DCM concept for exclusive control between a plurality of control apparatuses. A mode of realizing the API itself in each of the control apparatus and the apparatus to be controlled is not clearly specified. The conventional technique of the exclusive control method conformed with the HAVi specification will be called a second conventional technique hereinafter.

Japanese Unexamined Patent Application Publication No. 2003-116181 discloses another conventional technique (hereinafter, called a third conventional technique) of controlling the operation of an apparatus to be controlled from a remote control apparatus connected to a network to which the apparatus to be controlled is also connected.

In the third conventional technique, a single control server existing in the network has the control rights to control the operations of all of apparatuses to be controlled which are connected in the network. Each of the control rights corresponding to each of the apparatuses to be controlled is given to a control request terminal or the like other than the control server. When a plurality of control apparatuses capable of functioning as control servers exist in the same network, first, a process of acquiring the control right is performed among the control apparatuses, thereby setting a single control server in the network. That is, in the third conventional technique, the control rights on all of the apparatuses to be controlled are collectively controlled by a single control server existing in the network.

DISCLOSURE OF THE INVENTION

Problems to be Solved by the Invention

The conventional techniques, however, have the following problems.

The first conventional technique has a problem such that, as long as an apparatus to be controlled as a control object does not support the reserve command, the operation of the apparatus to be controlled cannot be exclusively controlled. Most of apparatuses to be controlled have the configuration for dealing the reserve command. It is therefore generally difficult to spread the exclusive control method using the reserve command.

In the second conventional technique, like the first conventional technique, it is substantially unrealistic that the apparatus to be controlled has the mechanism for the exclusive control. Therefore, the second conventional technique has to employ a method of controlling the apparatus to be controlled by storing exclusive control information conformed with the DCM in the control apparatus itself.

In this case, if only one set of a control apparatus and an apparatus whose operation is controlled by the control apparatus exists on the same serial bus, there is no problem. However, if a plurality of control apparatuses exist on the same serial bus, the following problem occurs. When a control apparatus having the function of the DCM and in which the exclusive control information is disconnected from the original serial bus, any one of the other remaining control apparatuses on the serial bus to which the apparatus to be controlled is also connected has to newly have the function of the DCM. However, it is impossible to receive the exclusive control information stored in the original control apparatus (which is disconnected and does not exist on the serial bus) from the control apparatus. Consequently, the exclusive control information used by the other apparatuses to be controlled and control apparatuses disappears from the network. To recover the original relation between the apparatus to be controlled and the control apparatus, a problem occurs such that transmission itself of information in the network becomes unstable for long time (in other words, transmission of information is interrupted).

Further, with respect to the third conventional technique, like the second conventional technique, there is no problem when only one set of a control apparatus and an apparatus to be controlled exists on the same serial bus. However, if a plurality of control apparatuses exist on the same serial bus and the control server having the control right on the whole is disconnected from the serial bus, the exclusive control information corresponding to the apparatuses to be controlled disappears from the network including the original serial bus. To recover it, like the second conventional technique, a problem occurs such that transmission itself of information in the network becomes unstable for long time.

The present invention has been achieved in view of the problems, and an object of the invention is to provide a control apparatus, a network system including the control apparatus, a control method in the control apparatus, a program for the control apparatus, and an information recording medium on which the program for the control apparatus is recorded, capable of performing exclusive control by a control apparatus in a single network without adding a new configuration to an existing apparatus to be controlled and, even in the case where the apparatus to be controlled or the control apparatus drops from the network, capable of maintaining and continuing the original exclusive control state.

Means for Solving the Problems

In order to solve the problems, the invention relates to a network system including one or more apparatuses to be controlled and one or more control apparatuses, at the time of controlling operation of any of the apparatuses to be controlled from any of the control apparatuses, the operation being controlled in such a manner that the apparatus to be controlled whose operation is controlled and the control apparatus for controlling the operation are associated one-on-one while excluding the other control apparatuses, wherein the control apparatus comprises exclusive control information storing means for storing, for each of the apparatuses to be controlled, exclusive control information indicating correspondence between operation of each of the apparatuses to be controlled and a control apparatus which controls the operation, and the operation in any of the apparatuses to be controlled is controlled on the basis of the stored exclusive control information.

One of the control apparatuses included in the network system is set as a central control unit, and the central control unit comprises:

first updating means, when request information indicative of a request to make the central control unit control the operation of any of the apparatuses to be controlled included in the network system is entered, for updating the exclusive control information stored in the central control unit in correspondence with the apparatus to be controlled which is shown in the request information to information indicating that the central control unit exclusively controls the operation of the apparatus to be controlled which is shown in the request information; and second updating means, when the request information is entered, for updating the exclusive control information stored in the control apparatuses other than the central control unit in correspondence with the apparatus to be controlled which is shown in the request information to information indicating that the central control unit exclusively controls the operation of the apparatus to be controlled which is shown in the request information.

In order to solve the problems, the invention relates to a control method executed by a control apparatus included in a network system including one or more apparatuses to be controlled and one or more control apparatuses, at the time of controlling operation of any of the apparatuses to be controlled from any of the control apparatuses, the operation being controlled in such a manner that the apparatus to be controlled whose operation is controlled and the control apparatus for controlling the operation are associated one-on-one while excluding the other control apparatuses, the method comprising:

a storing process of storing exclusive control information indicating correspondence between operation of each of the apparatuses to be controlled and a control apparatus which controls the operation, into exclusive control information storing means in each of the control apparatuses; and an operation control process of controlling the operation in any of the apparatuses to be controlled on the basis of the stored exclusive control information.

A central control method executed by a central control unit as any one of the control apparatuses included in the network system comprising:

a first updating process, when request information indicative of a request to make the central control unit control the operation of any of the apparatuses to be controlled included in the network system is entered, of updating the exclusive control information stored in the central control unit in correspondence with the apparatus to be controlled which is shown in the request information to information indicating that the central control unit exclusively controls the operation of the apparatus to be controlled which is shown in the request information; and a second updating process, when the request information is entered, of updating the exclusive control information stored in the control apparatuses other than the central control unit in correspondence with the apparatus to be controlled which is shown in the request information to information indicating that the central control unit exclusively controls the operation of the apparatus to be controlled which is shown in the request information.

In order to solve the problems, the invention relates to a program for a central control unit, for making a computer function as a central control unit in a network system as discussed above.

BRIEF DESCRIPTION OF DRAWINGS

FIG. 1A is a block diagram showing a general configuration of the bus system, and FIG. 1B is a block diagram showing the configuration of a control apparatus of the first embodiment.

FIG. 2 is a flowchart showing processes in the case where a new apparatus to be controlled is connected to a bus in the first embodiment.

FIG. 3A is a diagram showing the operation in the case where a control right acquisition request is generated in a master control apparatus, and FIG. 3B is a flowchart showing process of setting a control right in an individual control unit.

FIG. 4 is a flowchart showing operations performed in the case where the control right acquisition request is generated in the master control apparatus in the first embodiment.

FIG. 8A is a diagram showing the operation in the case where a master control apparatus is disconnected from the bus, and FIG. 8B is a diagram showing operation performed in the case where a master control apparatus is newly connected to the bus.

DESCRIPTION OF REFERENCE NUMERALS

Figure 1A:
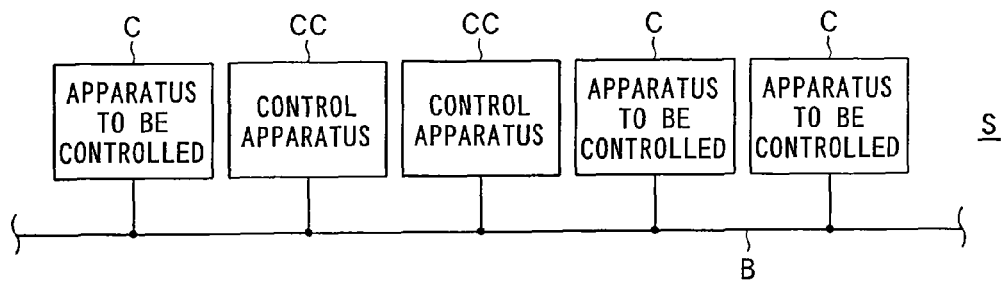
FIGS. 1A and 1B are block diagrams showing the configuration of a bus system in a first embodiment.

C apparatus to be controlled
CC control apparatus
B bus
S bus system
1 operation unit
2 request receiving unit
3 managing unit
31 recognizing unit
32 information managing unit
33 individual control unit generating unit
34 exclusive control information setting unit
4 individual control part
4A exclusive control information
41 control command issuing unit
42 exclusive control information holding unit
5 network communication unit
MCC master control apparatus
SCC slave control apparatus

MODES FOR CARRYING OUT THE INVENTION

Best modes for carrying out the present invention will now be described with reference to the drawings. In the following embodiments, for example, the invention is applied to the case where the above-described apparatus to be controlled and the control apparatus are connected to a bus such as a serial bus conformed with the IEEE1394 standard and the operation of the apparatus to be controlled is controlled by the control apparatus in a one-to-one corresponding manner.

(1) First Embodiment

A first embodiment of the present invention will be described with reference to FIGS. 1A and 1B to FIG. 7.

Figure 1B:
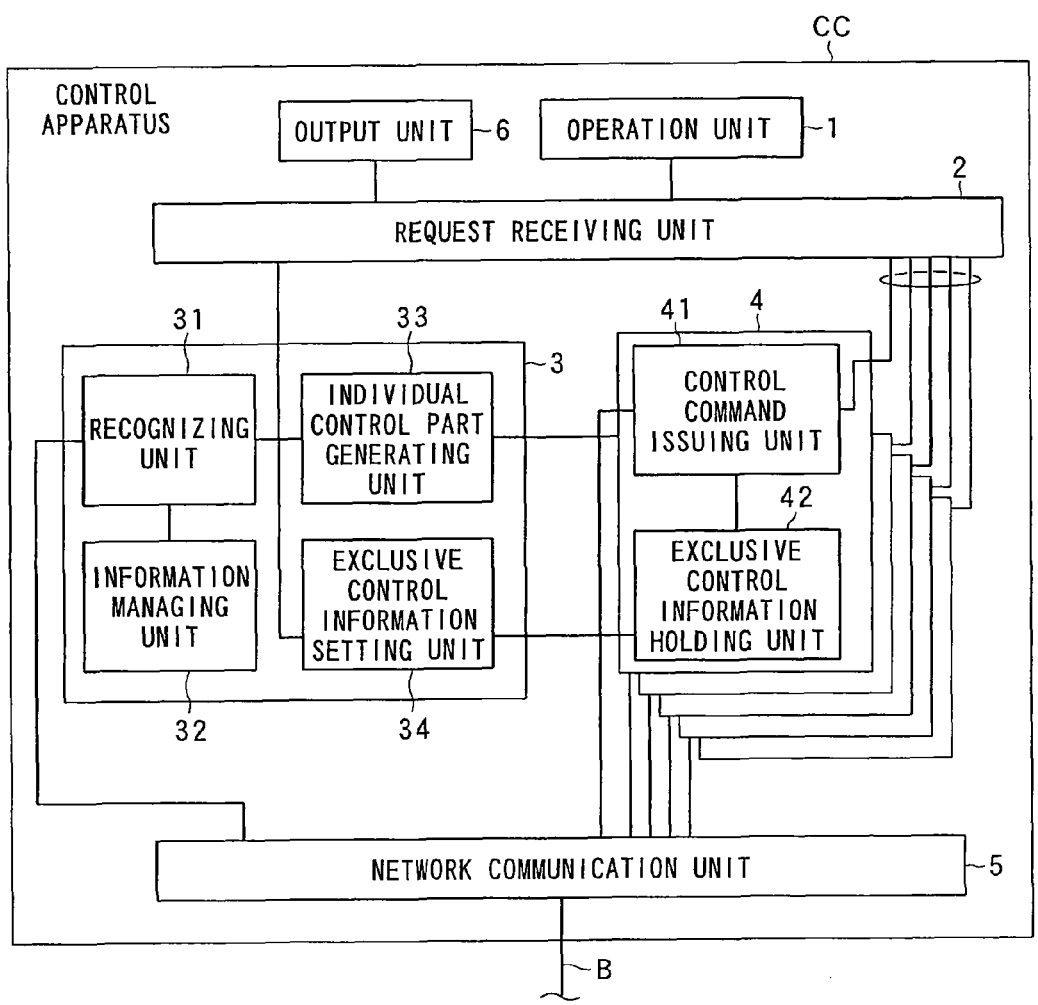
Figure 3A:
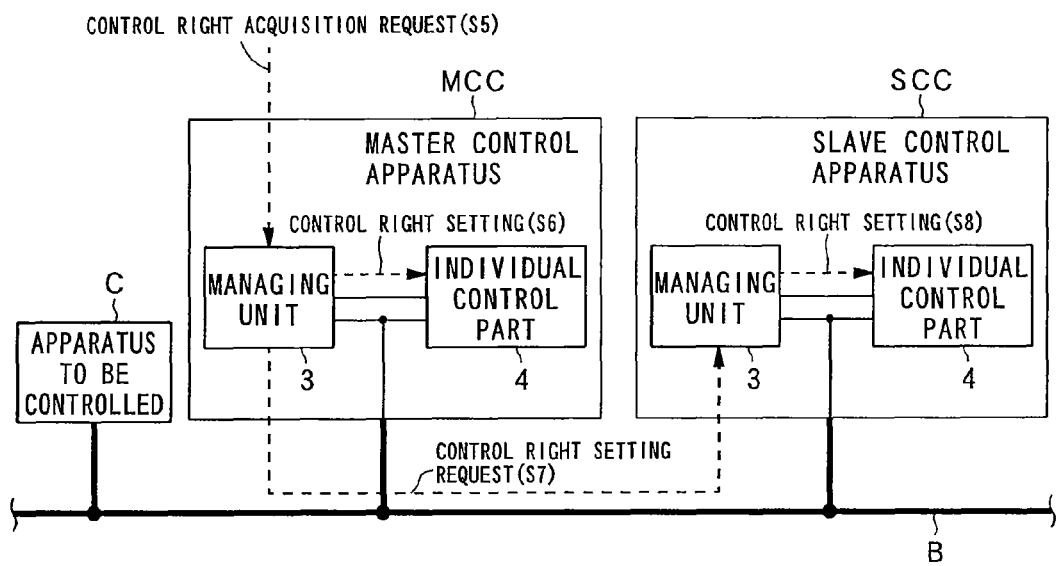
FIGS. 3A and 3B are diagrams showing the operation in the bus system in the first embodiment.
Figure 3B:
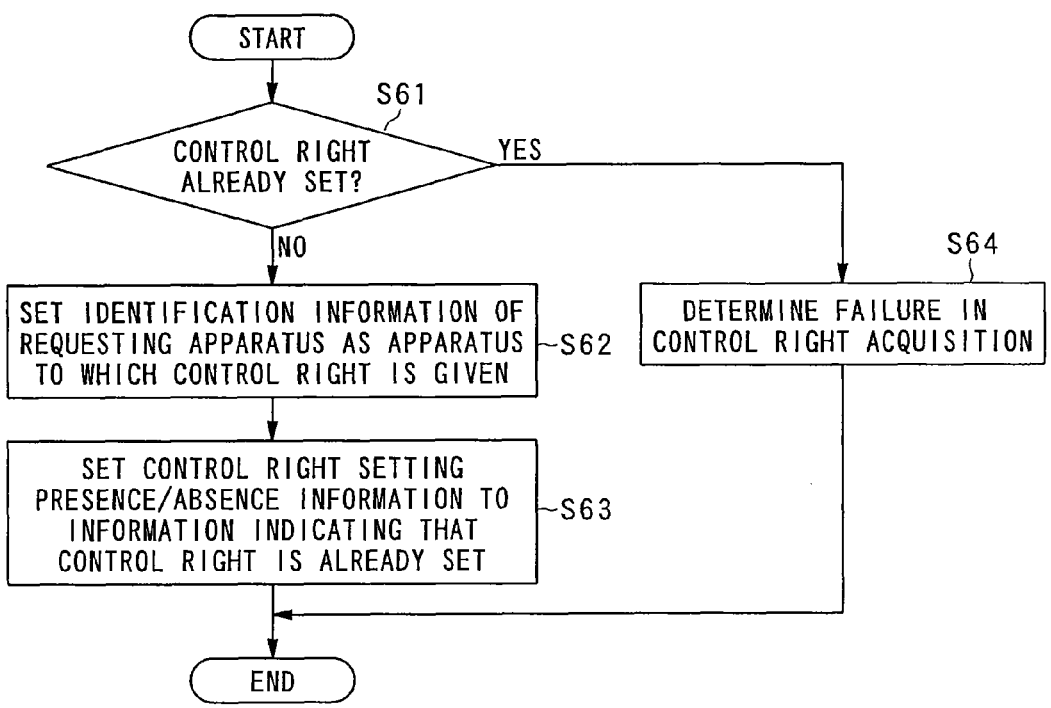
Figure 5:
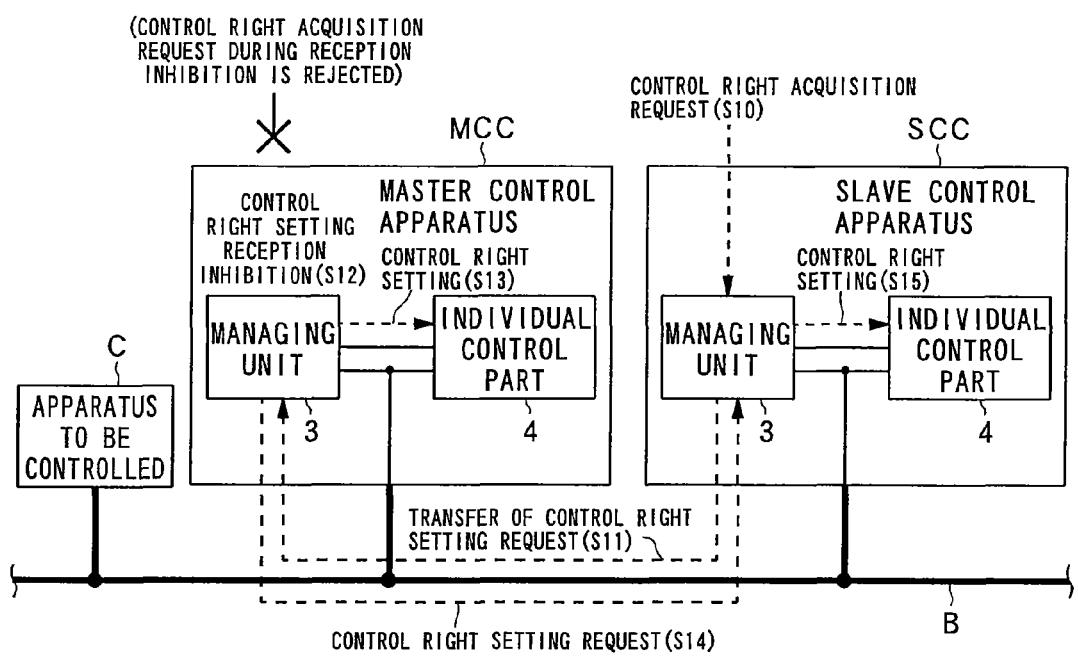
FIG. 5 is a diagram showing operations performed in the case where the control right acquisition request is generated in a slave control apparatus in the first embodiment.
Figure 6:
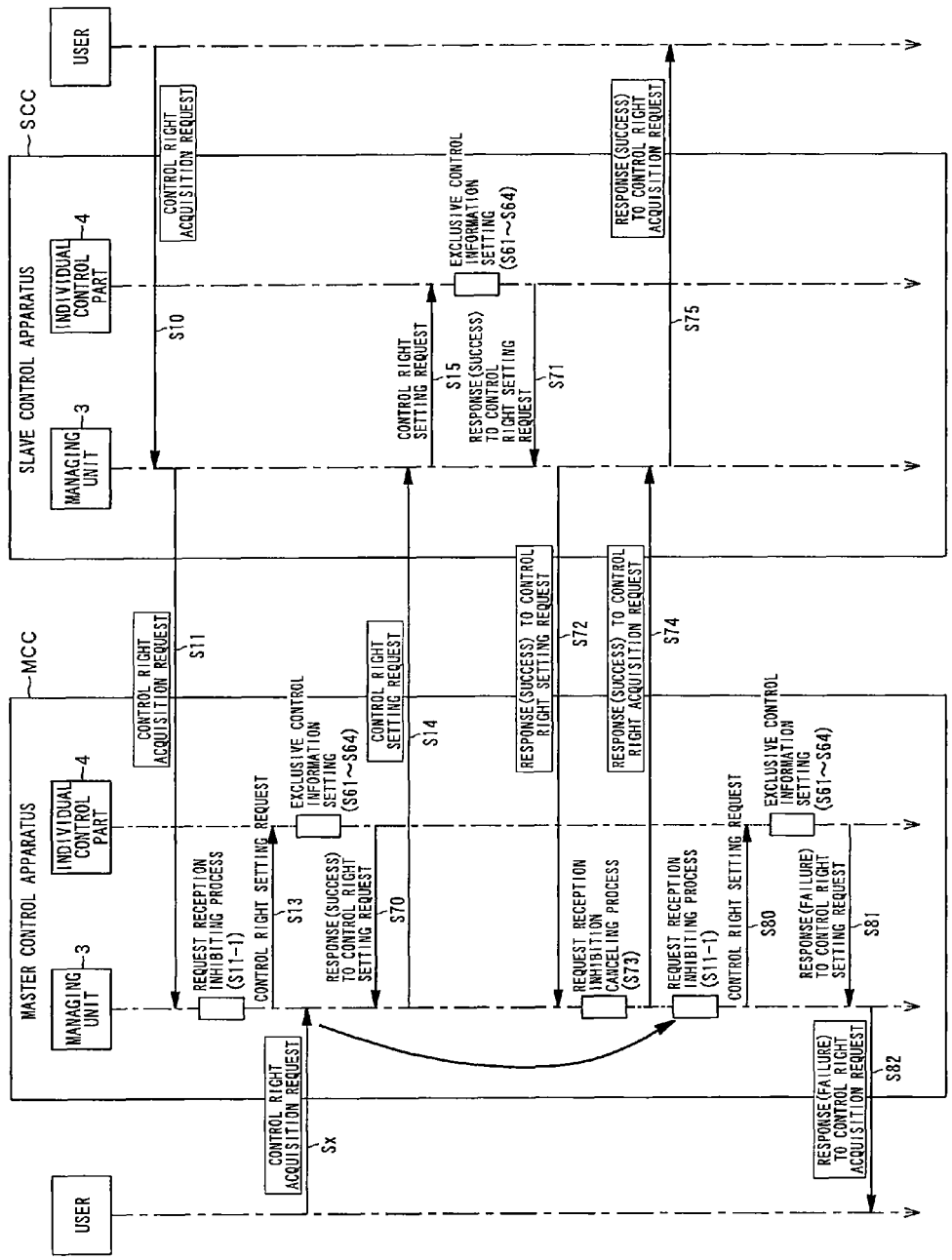
FIG. 6 is a flowchart showing operations performed in the case where the control right acquisition request is generated in the slave control apparatus in the first embodiment.
Figure 7:
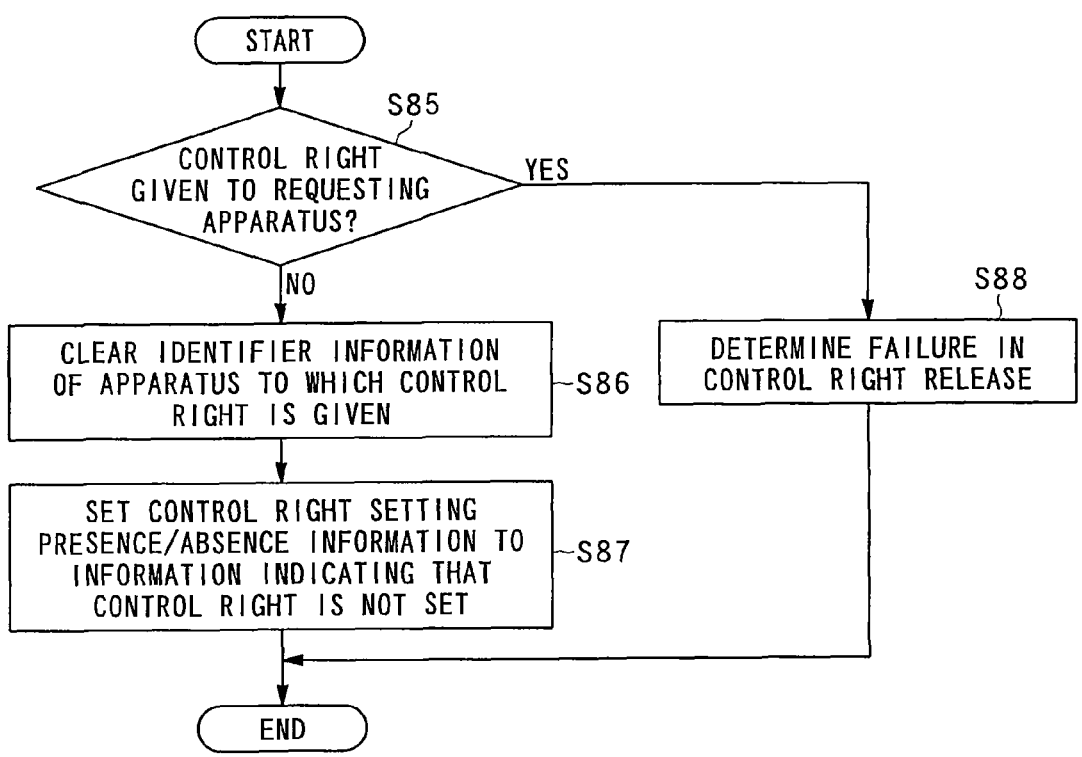
FIG. 7 is a flowchart showing process of releasing the control right in the individual control unit in the first embodiment.

FIGS. 1A and 1B are block diagrams showing the configuration of a bus system or the like in the first embodiment. FIG. 2 is a flowchart showing processes executed in a control apparatus according to the first embodiment. FIGS. 3A and 3B are diagrams showing the operation performed in the case where a request operation of a request to control the operation of an apparatus to be controlled connected to a bus is executed by a master control apparatus to be described later, in each of control apparatuses in the first embodiment. FIG. 4 is a flowchart showing processes executed in the control apparatus in the case where the operation shown in FIGS. 3A and 3B is executed. FIG. 5 is a diagram showing operation performed in the case where a request operation of a request to control the operation of the apparatus to be controlled connected to the bus by a slave control apparatus to be described later, in each of the control apparatuses in the first embodiment. FIG. 6 is a flowchart showing the whole process in each of the control apparatuses in the case where the operation shown in FIG. 5 is executed. FIG. 7 is a flowchart showing process of releasing the control right in an individual control part 4 which will be described later.

The embodiments will be described with respect to the case where a plurality of apparatuses to be controlled and a plurality of control apparatuses are connected to one bus, and the operation of one apparatus to be controlled is controlled only from one control apparatus excluding the other control apparatuses will be described. In addition, in the embodiment, the case where the request operation is executed in each of the plurality of control apparatuses will be described.

As shown in FIG. 1A, a bus system S according to the first embodiment has a configuration in which a plurality of apparatuses C to be controlled and a plurality of control apparatuses CC are connected to a bus B, and the operation of one of the apparatuses to be controlled is controlled by using one control apparatus. The configuration of the apparatus C to be controlled is similar to that of the apparatus to be controlled capable of exclusively controlling the operation via the bus B in the conventional technique.

More concretely, as the operation in the bus system S, for example, a user using the bus system S performs a necessary operation on the control apparatuses CC by using a remote controller or the like, thereby transmitting an operation command corresponding to the operation to an apparatus C to be controlled via the bus B. The apparatus C to be controlled which receives the operation command performs operation requested by the operation command. Further more concretely, for example, when the user makes, in a control apparatus, a recording programming setting of programming start of a recording operation in an apparatus to be controlled, the control apparatus starts at desired time and, further, sends the operation command indicative of "power-on", "recording start", or the like in the apparatus to be controlled from the control apparatus to the apparatus to be controlled. In response to the operation command, the recording operation in the apparatus C to be controlled is started.

Examples of the apparatus to be controlled in the first embodiment are an optical disk player/recorder, a digital video tape player/recorder, and a hard disk recorder. Examples of the control apparatus are a digital television apparatus, a digital tuner, a personal computer and the like for controlling the operation of the apparatuses to be controlled. The first embodiment can be applied to the case where the control apparatus CC of the first embodiment is included in, for example, an optical disk player and the operation of another optical disk recorder (an optical disk recorder as an apparatus to be controlled) is controlled by using the optical disk player.

Next, a concrete configuration of the control apparatus CC will be described with reference to FIG. 1B. FIG. 1B is a block diagram showing a general configuration of the control apparatus CC of the first embodiment. Each of the control apparatuses CC included in the bus system S has the configuration shown in FIG. 1B.

As shown in FIG. 1B, the control apparatus CC of the first embodiment has an operation unit 1 including an operation button, the remote controller, and the like, a request receiving unit 2, a managing unit 3, individual control units 4 of the same number as that of the apparatuses C to be controlled, which are associated with the apparatuses C to be controlled connected to the bus B in a one-to-one correspondence manner, a network communication unit 5 as monitoring means and output means directly connected to the bus B, and an output unit 6 such as a display.

The managing unit 3 has a recognizing unit 31, an information managing unit 32, an individual control unit generating unit 33, and an exclusive control information setting unit 34 as updating means and first to fourth updating means.

Further, each of the individual control units 4 has a control command issuing unit 41 and an exclusive control information holding unit 42 as exclusive control information storing means. Each of the individual control units 4 is realized by software using a physical memory, a logic circuit, and the like preliminarily provided in the control apparatus CC in accordance with the number of apparatuses C to be controlled which are connected to the bus B. Therefore, the number of individual control units 4 increases/decreases in accordance with the number of apparatuses C to be controlled.

Next, the operation will be described.

In the case of controlling the operation of any of the apparatuses C to be controlled by using the control apparatus CC of the first embodiment, when an operation indicative of the control is executed by the user on the operation unit 1, the request receiving unit 2 receives an operation signal corresponding to the executed operation.

In the first embodiment, the operation signal includes a control right acquisition request signal indicative of a request to acquire control right for controlling the operation of any of the apparatuses C to be controlled by the control apparatus CC, and a control command issue request signal indicative of a request to issue a control command used at the time of actually controlling the apparatus C to be controlled after acquisition of the control right. The received control acquisition request signal is output to the exclusive control information setting unit 34 in the managing unit 3, and the control command issue request signal is output to the control command issuing unit 41 in the individual control part 4 corresponding to the apparatus C to be controlled as the destination of the control command.

In the case where a response signal to each of the request signals is transmitted from the managing unit 3 to which the control acquisition request signal is output or the apparatus C to be controlled as an object of the control command issue request signal, the request receiving unit 2 notifies the user of the content of the response signal by outputting the response signal or the like to the output unit 6.

The details of the operation of the managing unit 3 to which the control right acquisition request signal is input and the details of the operation of the individual control part 4 to which the control command issue request signal is input will be described later.

On the other hand, the network communication unit 5 performs operations of managing information transmitting/receiving process via the bus B and a change in the configuration of the entire bus system S including the bus B (for example, a change in the configuration of the entire bus system S due to disconnection between the apparatus C to be controlled or the control apparatus CC and the bus B and new connection of the apparatus C to be controlled or the control apparatus CC to the bus B) and notifying the managing unit 3 or the like of whether a change occurs or not.

Next, the operation of each of the individual control units 4 will be described.

As stated above, the individual control units 4 correspond to the apparatuses C to be controlled included in the bus system S in a one-to-one corresponding manner, and each individual control part 4 is constructed in the control apparatus CC only when the corresponding apparatus C to be controlled is connected to the bus B. In the case where a plurality of apparatuses C to be controlled of the same kind and the same model are connected to the bus B, the individual control units 4 of only the same number as that of the apparatuses C to be controlled which are connected are provided.

The exclusive control information holding unit 42 in the individual control part 4 stores exclusive control information of the first embodiment. The exclusive control information includes: information indicating whether a control right corresponding to the apparatus C to be controlled, for controlling the operation of the apparatus C to be controlled connected to the bus B (that is, the apparatus C to be controlled corresponding to the individual control part 4) is set or not; and apparatus identification information (concretely, such as the GUID for identifying the control apparatuses CC) for identifying the control apparatus CC to which the control right is given in the case where the control right is set for the corresponding apparatus C to be controlled (or the user controlling the operation of the apparatus C to be controlled by using the control apparatus CC, a portable information terminal device or a remote controller to which the control right is given, or the like).

The exclusive control information itself is generated on the basis of a request from the exclusive control information setting unit 34, which will be described later, in the managing unit 3. More concretely, the identification information may be identification information expressing the user himself/herself, or identification information for identifying the portable information terminal device or the remote controller itself. Identification information for identifying software (module) such as an application program for realizing a so-called user interface on the operation unit 1 or an application program for automatically executing programmed-recording operation can be also used.

The control command issuing unit 41 issues a necessary control command for the apparatus C to be controlled as an object of an operation control via the network communication unit 5 in response to a request for controlling a device to be controlled from the user or the like via the operation unit 1. The control command issuing unit 41 recognizes and processes information notified from the apparatus C to be controlled as the object and response information to the control command from the apparatus C to be controlled and, as necessary, sends reply, notification, or the like to the control requester such as the user.

When the control command issuing unit 41 of the first embodiment receives a request for controlling the operation of the corresponding apparatus C to be controlled via the operation unit 1, the control command issuing unit 41 refers to the exclusive control information stored in the exclusive control information holding unit 42 prior to issue of the necessary control command, and recognizes the content of the setting of the control right on the apparatus C to be controlled as the destination of the control command. In the case where it is recognized as a result that no control right is set on the apparatus C to be controlled, or in the case where the control right is set and identification information identifying the user or the like making the request for controlling the operation of the apparatus C to be controlled is described in the exclusive control information, the control command issuing unit 41 issues a control command necessary for controlling the operation of the apparatus C to be controlled as the object for the apparatus C to be controlled.

On the other hand, in the case where the control right is set and identification information identifying another user or another control apparatus CC is included in the exclusive control information referred to, the operation request of the user or the like for controlling the apparatus C to be controlled by the control apparatus CC including the control command issuing unit 41 whose operation is being described is rejected. The information indicative of the rejection is output from the output unit 6 to the user or the like, and the control command issuing unit 41 does not issue a control command.

The operation of the managing unit 3 will now be described.

First, on reception of a notification indicating that the apparatus C to be controlled is newly added to the bus B from the network communication unit 5, the recognizing unit 31 in the managing unit 3 performs communication with the newly connected apparatus C to be controlled via the network communication unit 5 to obtain various information from the apparatus C to be controlled, thereby specifying the kind and the details of the newly connected apparatus C to be controlled. The obtained information is stored in the form of a database in the information managing unit 32.

On the other hand, when disconnection between any of the apparatuses C to be controlled and the bus B (that is, disconnection of the apparatus C to be controlled from the bus system S) is recognized via the network communication unit 5, the content such as corresponding information stored in the information managing unit 32 is updated.

Next, the individual control unit generating unit 33 in the managing unit 3 performs operation according to the state of connection/disconnection of the apparatus C to be controlled recognized by the recognizing unit 31 to the bus B. In the case where a new apparatus C to be controlled is additionally connected to the bus B, the individual control unit generating unit 33 generates an individual control part 4 corresponding to the newly connected apparatus C to be controlled. On the other hand, when the apparatus C to be controlled which has been connected to the bus B drops from the bus B, the corresponding individual control part 4 which has been operated until then is eliminated from the control apparatus CC.

The above operations in the managing unit 3 will be generally described by using the flowchart of FIG. 2 with respect to the case where a new apparatus C to be controlled is additionally connected to the bus B.

As shown in FIG. 2, the recognizing unit 31 which receives the notification indicating that a new apparatus C to be controlled is added performs communication with the apparatus C to be controlled to obtain various information (step S1), specifies the kind and the details of the newly connected apparatus C to be connected on the basis of the obtained information, and stores the information in the form of a database in the information managing unit 32 (step S2).

Next, on the basis of the information newly stored in the information managing unit 32, an individual control part 4 corresponding to the newly connected apparatus C to be controlled is generated (step S3). In the case of FIG. 1 where a plurality of control apparatuses CC exist, the process of generating a new individual control part 4 shown in FIG. 2 may be performed in each of the control apparatuses CC. However, in consideration of reducing the information transmission amount on the bus B, the processes from acquisition of the information indicative of the newly connected apparatus C to be connected (see step S1 in FIG. 2) to determination of the kind and the like (see step S2 in FIG. 2) are executed only by one control apparatus CC (hereinafter, the representative control apparatus CC will be called a master control apparatus MCC) in the plurality of control apparatuses CC. The control apparatuses CC other than the master control apparatus MCC (hereinafter, the control apparatuses CC other than the master control apparatus MCC will be called slave control apparatuses SCC) may receive the information indicative of the specified kind and the like provided from the master control apparatus MCC and perform only the process of generating the individual control part 4 in the slave control apparatuses SCC. A method of determining the master control apparatus MCC out of the plurality of control apparatuses CC will be described later.

On the basis of the control right acquisition request signal sent via the request receiving unit 2 from the user or the like, the exclusive control information setting unit 34 sends a request to set a control right corresponding to the apparatus C to be controlled to the individual control part 4 corresponding to the apparatus C to be controlled indicated by the request signal.

The operation of the exclusive control information setting unit 34 in the first case where the control right acquisition request signal is executed by the operation unit 1 in the master control apparatus MCC and the master control apparatus MCC itself acquires the control right and that in the second case where the control right acquisition request signal is executed by the operation unit 1 in the slave control apparatus SCC and the slave control apparatus SCC acquires the control right are different from each other. Consequently, each of the cases will be described with reference to FIGS. 3A and 3B to FIG. 7.

(I-i) Embodiment in the Case where Master Control Apparatus MCC Acquires Control Right First, the first case where an operation for the control right acquisition request is executed in the operation unit 1 in the master control apparatus MCC will be described with reference to FIG. 3A.

As shown in FIG. 3A, the master control apparatus MCC and the slave control apparatus SCC are connected to the same bus B, and the operation of the apparatus C to be controlled which is connected to the bus B is controlled by the master control apparatus MCC. In this case, when an operation of acquiring the control right on the operation of the apparatus C to be controlled is performed by using the operation unit 1 in the master control apparatus MCC from the user or the like (step S5), the exclusive control information setting unit 34 in the managing unit 3 which receives the corresponding control right acquisition request signal makes the individual control part 4 included in the same master control apparatus MCC (the individual control part 4 preliminarily generated in the master control apparatus MCC in correspondence with the apparatus C to be controlled as a control object of the operation) set the requested control right (step S6).

The control right setting process in the step S6 will be described more concretely with reference to FIG. 3B.

As the control right setting process, first, by referring to the exclusive control information held in the exclusive control information holding unit 42 in the individual control part 4 to which the setting is instructed, a check is made to see whether the control right to control the operation of the apparatus C to be controlled is already set by a control apparatus CC other than the master control apparatus MCC or not with respect to the apparatus C to be controlled whose operation is presently requested to be controlled (step S61). If the control right has been already set by another control apparatus CC (YES in step S61), a reply indicative of the fact is sent to the exclusive control information setting unit 34, and the exclusive control information setting unit 34 which receives the reply notifies the user of the fact via the output unit 6 (step S64).

On the other hand, when it is determined in step S61 that the control right has not been set yet in the apparatus C to be controlled as an object of operation control by another control apparatus CC (NO in step S61), the exclusive control information corresponding to the apparatus C to be controlled is set in the corresponding individual control part 4 so as to include apparatus identification information indicative of the master control apparatus MCC in which the operation of the control right setting request is performed (apparatus identification information such as the GUID) as the control apparatus CC for acquiring the control right on the apparatus C to be controlled as an object (step S62). Further, the exclusive control information is rewritten to information indicating that the control right of the corresponding apparatus C to be controlled is already set (step S63). After that, the control right setting process in the individual control part 4 is finished.

When it is set in the individual control part 4 corresponding to the apparatus C to be controlled in the master apparatus MCC that the master control apparatus MCC has the control right of the target apparatus C to be controlled (step S6), a control right setting request is made via the bus B, to request rewriting of the exclusive control information stored in the individual control part 4 corresponding to the apparatus C to be controlled in the slave control apparatus SCC with information indicating that the control right of the target apparatus C to be controlled has been acquired by the master control apparatus MCC (step S7).

The exclusive control information setting unit 34 in the managing unit 3 of the slave control apparatus SCC which receives the control right setting request from the master control apparatus MCC makes the individual control part 4 included in the slave control apparatus SCC (that is, the individual control part 4 generated in correspondence with the apparatus C to be controlled whose control right is acquired by the master control apparatus MCC) set the requested control right (step S8).

The control right setting process executed in the slave control apparatus SCC in the step S8 is basically similar to that described with reference to FIG. 3B.

Specifically, as the control right setting process in the slave control apparatus SCC, first, the exclusive control information setting unit 34 refers to the exclusive control information held in the exclusive control information holding unit 42 in the individual control part 4 corresponding to the apparatus C to be controlled whose control right is acquired by the master control apparatus MCC, thereby determining whether or not the control right to control the operation of the apparatus C to be controlled, whose operation control is being presently requested, is set from a control apparatus CC other than the master control apparatus MCC (step S61). In the case where the control right from a control apparatus CC other than the master control apparatus MCC has been already set for the apparatus C to be controlled as an object of the operation control in the individual control part 4 in the slave control apparatus SCC for some reason (YES in step S61, in this case, the exclusive control information held in the individual control part 4 corresponding to the apparatus C to be controlled in the master control apparatus MCC and the exclusive control information held in the individual control part 4 corresponding to the apparatus C to be controlled in the slave control apparatus SCC are different from each other), the fact is notified to the original master control apparatus MCC via the bus B (step S64). After that, it is preferable, for example, to rewrite the exclusive control information in association with transmission of the control information requesting to rewrite the exclusive control information from the master control apparatus MCC which has received the notification so that the exclusive control information matches the corresponding exclusive control information in the master control apparatus MCC.

On the other hand, when it is determined in step S61 that the control right has not been set yet in the apparatus C to be controlled as an object of operation control by another control apparatus CC (NO in step S61), the exclusive control information corresponding to the apparatus C to be controlled is set in the individual control part 4 so as to include apparatus identification information indicative of the master control apparatus MCC which has acquired the control right as the control apparatus CC for acquiring the control right of the target apparatus C to be controlled (step S62). Further, the exclusive control information is rewritten to information indicating that the control right on the corresponding apparatus C to be controlled is already set (step S63). After that, the control right setting process in the individual control part 4 is finished.

Next, processes for acquiring the control right on the apparatus C to be controlled in the master control apparatus MCC described with reference to FIGS. 3A and 3B will be mentioned in time sequence by using FIG. 4. FIG. 4 is a flowchart showing processes in time sequence from top to bottom since the operation of requesting that the master control apparatus MCC acquires the control right on the apparatus C to be controlled is performed in the master control apparatus MCC shown in FIG. 3A until the master control apparatus MCC actually acquires the control right. In FIG. 4, step numbers similar to those in FIG. 3B are given to processes similar to those shown in FIG. 3B, and their detailed description will not be repeated.

As shown in FIG. 4, when the operation for requesting acquisition of the control right on the apparatus C to be controlled is performed in the master control apparatus MCC (step S5), the managing unit 3 performs a process of inhibiting other request operations until the control right based on the request is acquired (step S5-1). After the inhibiting process is executed, even when another operation for requesting acquisition of the control right on the apparatus C to be controlled on which the control right is being set at present is executed in the master control apparatus MCC, the process for the operation is stopped until the present process is completed or a message indicating that the operation is invalid is displayed, for example, in the output unit 6 or the like in the master control apparatus MCC.

After completion of the inhibiting process in step S5-1, the managing unit 3 generates a control right setting request to the individual control part 4 in the master control apparatus MCC (step S6). A control right setting process corresponding to the request (concretely, a process of rewriting exclusive control information in the corresponding individual control part 4) is executed (steps S61 to S64 in FIG. 3B). A response indicating that the setting process is performed successfully is sent to the managing unit 3 (step S65).

After completion of the control right acquiring process in the master control apparatus MCC, a similar setting request for acquiring the control right is generated for the managing unit 3 in the slave control apparatus (step S7). The managing unit 3 generates a control right setting request to the individual control part 4 in the slave control apparatus SCC (the individual control part 4 corresponding to the apparatus C to be controlled as an object of the operation control) (step S8). A control right setting process corresponding to the request is executed in the individual control part 4 (steps S61 to S64 in FIG. 3B). A response indicating that the setting process is performed successfully is sent to the managing unit 3 in the master control apparatus MCC via the managing unit 3 in the slave control apparatus SCC (steps S65 and S66).

After that, the process of inhibiting the other request operations executed in the managing unit 3 in the master control apparatus MCC (step S5-1) is cancelled (step S67). Further, a response indicative of success in the acquisition is notified to the user who requested acquisition of the control right to the master control apparatus MCC, by using the output unit 6 or the like (step S68). After that, the series of processes for the control right acquisition is completed.

(I-ii) Embodiment in the Case where Slave Control Apparatus SCC Acquires Control Right Next, the second case in which the operations for a request to acquire the control right on the apparatus C to be controlled are performed in the operation unit 1 in the slave control apparatus SCC will be described with reference to FIG. 5.

As shown in FIG. 5, the master control apparatus MCC and the slave control apparatus SCC are connected to the same bus B, and the operation of the apparatus C to be controlled connected to the bus B is controlled by the slave control apparatus SCC. In this case, when the user or the like performs an operation of acquiring the control right on the operation of the apparatus C to be controlled by using the operation unit 1 in the slave control apparatus SCC (step S10), the exclusive control information setting unit 34 in the managing unit 3 which receives a corresponding control right acquisition request signal transfers the control right acquisition request signal to the exclusive control information setting unit 34 in the managing unit 3 included in the master control apparatus MCC via the bus B (step S11).

The exclusive control information setting unit 34 in the master control apparatus MCC which receives the control right acquisition request signal makes the individual control part 4 included in the same master control apparatus MCC (that is, the individual control part 4 generated in advance in the master control apparatus MCC in correspondence with the apparatus C to be controlled as an object of the operation control from the slave control apparatus SCC) set the requested control right (step S13).

As the control right setting process in the step S13, basically, processes similar to those in the case described with reference to FIG. 3B are executed.

Specifically, as the control right setting process, first, by referring to the exclusive control information held in the exclusive control information holding unit 42 in the individual control part 4 instructed to make the setting, whether or not the control right to control the operation of the apparatus C to be controlled, whose operation control is being presently requested by the slave control apparatus SCC, is set from a control apparatus CC other than the slave control apparatus SCC is determined (step S61 in FIG. 3B). In the case where the control right from another control apparatus CC has been already set (YES in step S61 in FIG. 3B), a reply indicative of the fact is sent to the slave control apparatus SCC via the bus B. The exclusive control information setting unit 34 in the slave control apparatus SCC which receives the reply notifies the user of the fact via the output unit 6 in the slave control apparatus SC (step S64 in FIG. 3B).

On the other hand, when it is determined in the confirming process (step S61 in FIG. 3B) that the control right has not been set yet in the apparatus C to be controlled as an object of operation control of the slave control apparatus SCC by another control apparatus CC (NO in step S61 in FIG. 3B), the exclusive control information corresponding to the apparatus C to be controlled is set in the corresponding individual control part 4 so as to include apparatus identification information indicative of the slave control apparatus SCC which has performed the control right setting request as the control apparatus CC for acquiring the control right of the target apparatus C to be controlled (step S62 in FIG. 3B). Further, the exclusive control information is rewritten to information indicating that the control right on the corresponding apparatus C to be controlled is already set (step S63 in FIG. 3B). After that, the control right setting process in the individual control part 4 is finished.

When it is set in the individual control part 4 corresponding to the apparatus C to be controlled in the master apparatus MCC that the slave control apparatus SCC has the control right on the target apparatus C to be controlled (step S13), a control right setting request is made via the bus B to the slave control apparatus SCC, to request rewriting of the exclusive control information stored in the individual control part 4 corresponding to the apparatus C to be controlled as the object of the operation control in the slave control apparatus SCC with information indicating that the control right of the apparatus C to be controlled is acquired by the slave control apparatus SCC (step S14).

The exclusive control information setting unit 34 in the managing unit 3 of the slave control apparatus SCC which receives the control right setting request from the master control apparatus MCC makes the individual control part 4 included in the slave control apparatus SCC (that is, the individual control part 4 generated in advance in the slave control apparatus SCC in correspondence with the apparatus C to be controlled whose control right is acquired by the slave control apparatus SCC) set the requested control right (step S15).

The control right setting process executed in the slave control apparatus SCC in the step S15 is basically similar to that described with reference to FIG. 3B.

Specifically, as the control right setting process in the slave control apparatus SCC, first, the exclusive control information setting unit 34 in the slave control apparatus SCC refers to the exclusive control information held in the exclusive control information holding unit 42 in the individual control part 4 corresponding to the apparatus C to be controlled whose control right is acquired by the slave control apparatus SCC, thereby determining whether or not the control right to control the operation of the apparatus C to be controlled, whose operation control is being presently requested, is set from a control apparatus CC other than the slave control apparatus SCC (step S61 in FIG. 3B). In the case where the control right from a control apparatus CC other than the slave control apparatus SCC has been already set for the apparatus C to be controlled as an object of the operation control in the individual control part 4 in the slave control apparatus SCC for some reason (YES in step S61 in FIG. 3B, in this case, the exclusive control information held in the individual control part 4 corresponding to the apparatus C to be controlled in the slave control apparatus SCC and the exclusive control information held in the individual control part 4 corresponding to the apparatus C to be controlled in the master control apparatus MCC are different from each other), the fact is notified to the original master control apparatus MCC via the bus B (step S64 in FIG. 3B). After that, it is preferable, for example, to rewrite the exclusive control information in association with transmission of the control information requesting to rewrite the exclusive control information from the master control apparatus MCC which has received the notification so that the exclusive control information matches the corresponding exclusive control information in the master control apparatus MCC.

On the other hand, when it is determined in the confirming process (step S61 in FIG. 3B) that the control right has not been set yet in the apparatus C to be controlled as an object of operation control by another control apparatus CC (NO in step S61 in FIG. 3B), the exclusive control information corresponding to the apparatus C to be controlled is set in the individual control part 4 so as to include apparatus identification information indicative of the slave control apparatus SCC which has acquired the control right as the control apparatus CC for acquiring the control right of the target apparatus C to be controlled (step S62 in FIG. 3B). Further, the exclusive control information is rewritten to information indicating that the control right on the corresponding apparatus C to be controlled is already set (step S63 in FIG. 3B). After that, the control right setting process in the individual control part 4 is finished.

Next, processes for acquiring the control right on the apparatus C to be controlled in the slave control apparatus SCC described with reference to FIG. 5 will be mentioned in time sequence by using FIG. 6. FIG. 6 is a flowchart showing processes in time sequence from top to bottom since the operation of requesting that the slave control apparatus SCC acquires the control right on the apparatus C to be controlled is performed in the slave control apparatus SCC shown in FIG. 5 until the slave control apparatus SCC actually acquires the control right. In FIG. 6, step numbers similar to those in FIG. 5 are given to processes similar to those shown in FIG. 5, and their detailed description will not be repeated.

As shown in FIG. 6, when the operation for requesting acquisition of the control right on the apparatus C to be controlled is performed in the slave control apparatus SCC (step S10), the managing unit 3 in the slave control apparatus SCC sends a request for setting the control right to the managing unit 3 in the master control apparatus MCC via the bus B (step S11).

The managing unit 3 in the master control apparatus MCC which received the request performs a process of inhibiting other control right requests to the master control apparatus MCC until the control right based on the request is acquired (step S11-1). After the inhibiting process is executed, even when another operation for requesting acquisition of the control right on the apparatus C to be controlled on which the control right is being set at present is executed in the master control apparatus MCC, the process for the operation is stopped until the present process is completed or a message indicating that the operation is invalid is displayed, for example, in the output unit 6 or the like in the master control apparatus MCC.

After completion of the inhibiting process in step S11-1, the managing unit 3 generates a control right setting request to the individual control part 4 in the master control apparatus MCC (step S13). A control right setting process corresponding to the request (concretely, a process of rewriting exclusive control information in the corresponding individual control part 4) is executed (steps S61 to S64 in FIG. 3B). A response indicating that the setting process is performed successfully is sent to the managing unit 3 (step S70).

After completion of the control right acquiring process in the master control apparatus MCC, a setting request for acquiring the control right in the slave control apparatus SCC is generated for the managing unit 3 in the slave control apparatus SCC (step S14). The managing unit 3 in the slave control apparatus SCC generates a control right setting request to the individual control part 4 in the slave control apparatus SCC (the individual control part 4 corresponding to the apparatus C to be controlled as an object of the operation control) (step S15). A control right setting process corresponding to the request is executed in the individual control part 4 (steps S61 to S64 in FIG. 3B). A response indicating that the setting process is performed successfully is sent to the managing unit 3 in the master control apparatus MCC via the managing unit 3 in the slave control apparatus SCC (steps S71 and S72).

After that, the process of inhibiting the other request operations executed in the managing unit 3 in the master control apparatus MCC (step S11-1) is cancelled (step S73). Further, a response indicative of success in the acquisition is notified from the managing unit 3 in the master control apparatus MCC to the user who requested acquisition of the control right to the slave control apparatus SCC via the managing unit 3 and the output unit 6 in the slave control apparatus SCC (steps S74 and S75). After that, the series of processes for the control right acquisition in the slave control apparatus SCC is completed.

When the user of the master control apparatus MCC shown at the left end of FIG. 6 separately generates a request for acquiring the control right on the apparatus C to be controlled which is acquired by the slave control apparatus SCC during inhibition of other control right setting requests (step S11-1, refer to the thick arrow in FIG. 6) (step Sx), the request is held until the request reception inhibition is cancelled (step S73). After cancellation of the request reception inhibition, the request is received by the managing unit 3 in the master control apparatus MCC. A process of inhibiting other control right requests to the master control apparatus MCC until acquisition of the control right based on the request is performed (step S11-1). After that, the control right acquisition request is transferred from the exclusive control information setting unit 34 in the managing unit 3 to the individual control part 4 corresponding to the apparatus C to be controlled (step S80). Since exclusive control information indicating that the control right of the target apparatus C to be controlled is acquired by the slave control apparatus SCC is already held in the individual control part 4 (steps S61 to S64 in FIG. 3B), a response that the request of the user is not accepted is sent from the individual control part 4 to the exclusive information setting unit 34 (step S81). Further, the response is sent to the user who tried to acquire the control right of the apparatus C to be controlled (step Sx) by operating the master control apparatus MCC via the output unit 6 of the master control apparatus MCC (step S82).

In the case where a plurality of control apparatuses CC are connected to a single bus B in the foregoing first embodiment, with respect to setting of one of the control apparatuses CC as the master control apparatus MCC, for example, it is preferable to compare the values of the apparatus identification information of the control apparatuses CC connected to the bus B with each other and set the control apparatus CC having the largest value as the master control apparatus MCC.

For example, in the 1394 standard, when one control apparatus CC is detached from the bus B, all of the control apparatuses CC grasp the apparatus identification information of the control apparatuses CC after the detachment. Consequently, in accordance with the grasped values of the apparatus identification information, in the case where the value of the apparatus identification information indicative of a control apparatus CC itself is larger than that of the apparatus identification information showing another control apparatus CC, the control apparatus CC itself recognizes to be the master control apparatus MCC and functions as the master control apparatus MCC. Similarly, in the case where the value of the apparatus identification information indicative of a control apparatus CC itself is smaller than that of the apparatus identification information showing another control apparatus CC recognized, the control apparatus CC itself recognizes to be a slave control apparatus SCC and functions as the slave control apparatus SCC.

For the process in the case where the control right on the apparatus C to be controlled whose operation control right is to be acquired has been already set from any of the control apparatuses CC (NO in step S61 in FIG. 3B), at the time of canceling the set control right and newly resetting a control right, it is necessary to release the originally set control right to the control apparatus CC requesting acquisition of the control right.

In this case, as shown in FIG. 7, the exclusive control information setting unit 3 in the control apparatus C in which the control right to be released is set refers to the exclusive control information holding unit 42 in the corresponding individual control part 4, and checks whether the control right is already set on the apparatus C to be controlled corresponding to the individual control part 4 or not (step S85). When no control right is set (NO in step S85), it is unnecessary to release the control right and a response indicative of failure to the release request is sent to the requester (step S88).

On the other hand, when the control right is already set by any of the control apparatuses CC in the process of step S85 (YES in step S85), the apparatus identification information indicative of the control apparatus CC having the control right is erased from the corresponding exclusive control information to release the control right (step S86). Further, the information is rewritten to information indicating that the control right of the control apparatus CC is not set by any of the control apparatuses CC (step S87), and the process for the release is finished.

Further, with respect to processes performed in the case where the apparatus C to be controlled whose operation is controlled by any of the control apparatuses CC drops from the bus B, when the drop occurs, first, the network communication unit 5 in each of the control apparatuses CC detects the drop of the apparatus C to be controlled, and notifies the managing unit 3 included in the same control apparatus CC of the drop. The managing unit 3 receiving the notification deletes the individual control part 4 in the control apparatus CC corresponding to the apparatus C to be controlled which is dropped (detached) from the bus B from the control apparatus CC. At this time, all of information including the exclusive control information held in the individual control part 4 is also deleted. By the processes, the drop is recognized in each of the control apparatuses CC.

As described above, in the operation of the bus system S according to the first embodiment, each of the control apparatuses CC has the exclusive control information holding unit 42 for holding the exclusive control information for each apparatus C to be controlled, and controls the operation of the apparatus C to be controlled on the basis of the held exclusive control information. Thus, without adding any new configuration to the apparatus C to be controlled, the one-to-one corresponding relation is established between the apparatus C to be controlled and the control apparatus CC, and the operations of the apparatuses C to be controlled can be exclusively controlled.

Since the exclusive control information corresponding to all of the apparatuses C to be controlled is held in each of the exclusive control information holding units 42 included in the control apparatuses CC, the control apparatuses CC can share the same exclusive control information. When any of the control apparatuses CC drops from the bus system S, the exclusive control information corresponding to each of the apparatus CC to be controlled is left in any of the control apparatuses CC remaining in the bus system S. Therefore, the operation control of the apparatus C to be controlled can be continued in conformity with the standard also after the drop.

Further, when information of a request to control the operation of any of the apparatuses C to be controlled is input to the master control apparatus MCC, the exclusive control information in the apparatuses CC to be controlled is updated so as to obtain the relation between the apparatus C to be controlled and the master control apparatus MCC shown in the request information. Thus, the operation control can be performed between each of the apparatuses C to be controlled and each of the control apparatuses CC without contradiction.

Further, also in the case where information of a request to control the operation of any of the apparatuses C to be controlled is input to the slave control apparatus SCC, the exclusive control information in the control apparatuses CC is updated so as to obtain the relation between the apparatus C to be controlled and the control apparatus CC shown in the request information. Thus, the operation control can be performed between each of the apparatuses C to be controlled and each of the control apparatuses CC without contradiction.

In addition, any of the control apparatuses CC is set as the master control apparatus MCC on the basis of the apparatus identification information such as GUID for identifying the control apparatuses CC. Consequently, any of the control apparatuses CC can be set as the master control apparatus MCC without any contradiction in relation with the other slave control apparatuses SCC.

(II) Second Embodiment

Figure 8A:
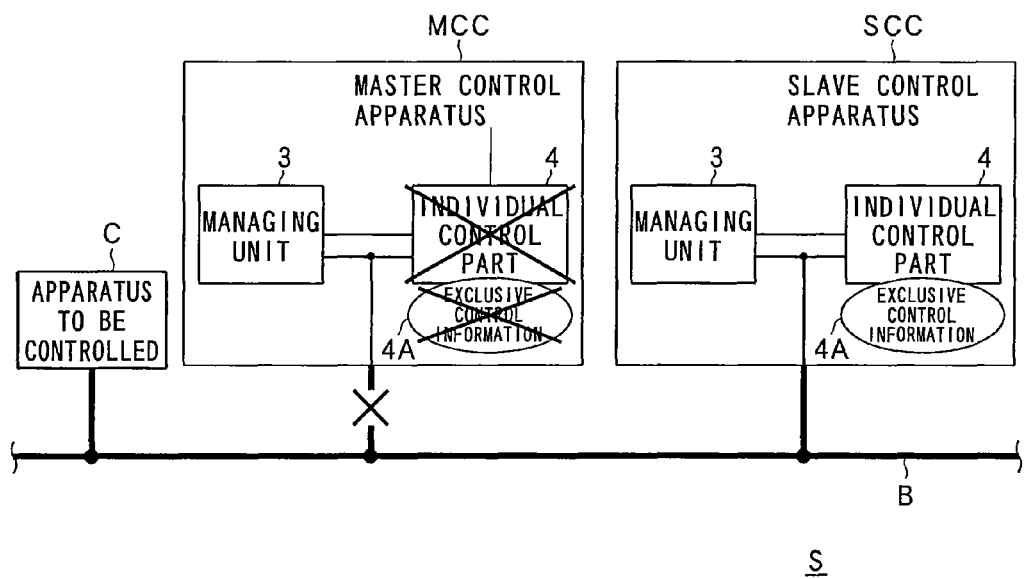
FIGS. 8A and 8B are diagrams showing the operation in a bus system in a second embodiment.
Figure 8B:
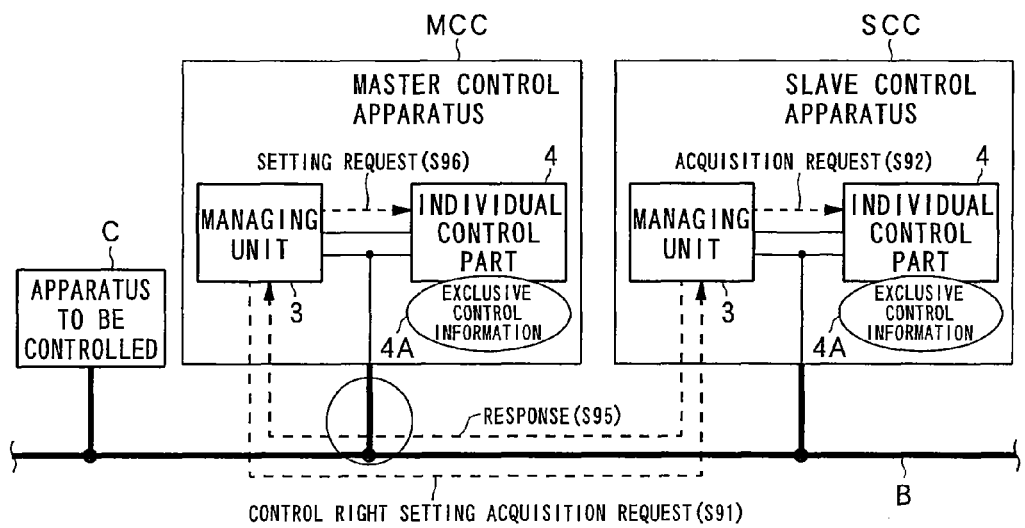
Figure 9:
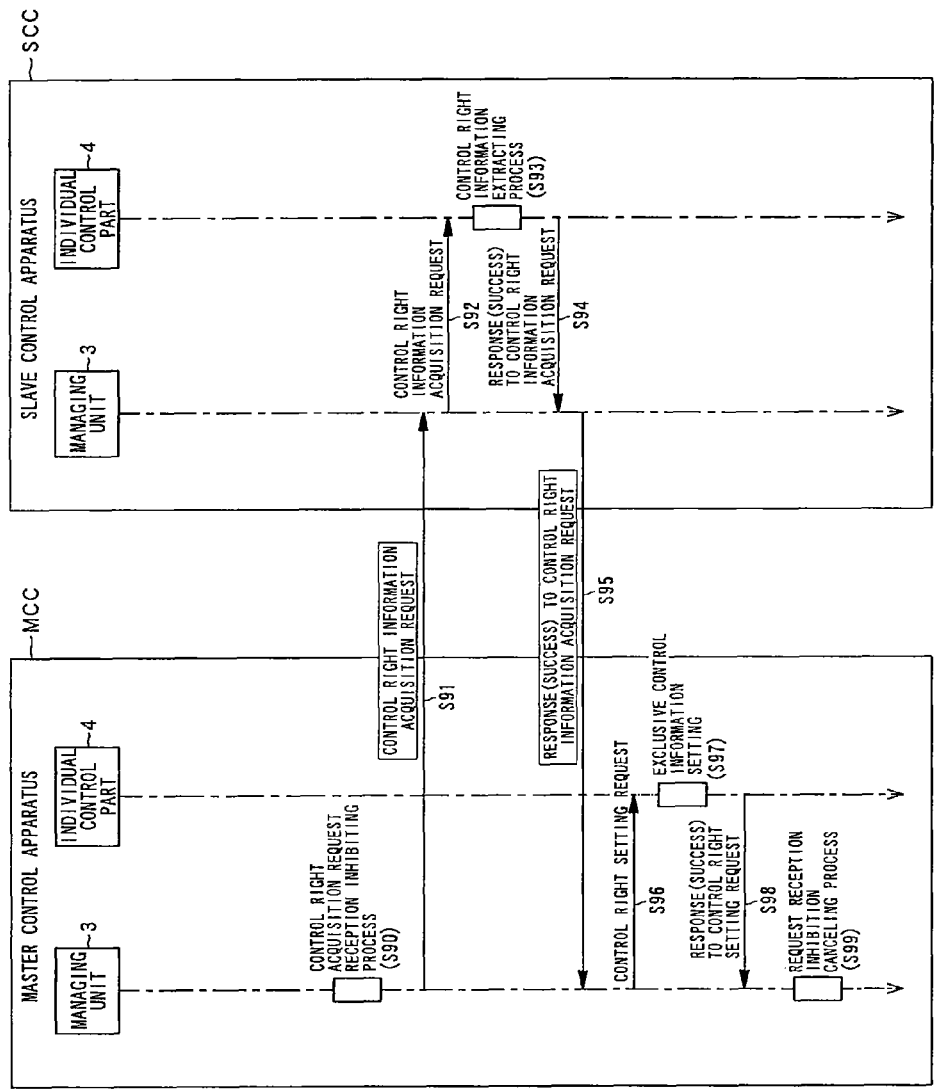
FIG. 9 is a flowchart showing operations performed in the case where a master control apparatus is newly connected to the bus in the second embodiment.

Next, a second embodiment as another embodiment of the present invention will be described by referring to FIGS. 8A and 8B and FIG. 9. FIGS. 8A and 8B are block diagrams showing the configuration and operation of a bus system of the second embodiment. FIG. 9 is a flowchart showing operations of the bus system of the second embodiment. In FIGS. 8A and 8B and FIG. 9, similar reference numerals are designated to components similar to those of the bus system S of the first embodiment, and their detailed description will not be repeated.

In the first embodiment, the processes for acquiring the control right to control the operation of any of the apparatuses C to be controlled which are connected to the bus B by either the master control apparatus MCC or the slave control apparatus SCC have been described. In the following second embodiment, handling of exclusive control information in the case where the master control apparatus MCC or the apparatus C to be controlled is detached from the bus B in the bus system S in the first embodiment will be described.

(II-i) Embodiment in the Case where Master Control Apparatus MCC is Detached from Bus B In the second embodiment, processes performed in the case where the master control apparatus MCC is detached (drops) from the bus B will be described with reference to FIG. 8A. As the precondition of FIG. 8A, it is assumed that one master control apparatus MCC and one slave control apparatus SCC are connected to the bus B, and the operation of the apparatus C to be controlled is controlled by either the master control apparatus MCC or the slave control apparatus SCC.

As shown in FIG. 8A, in the master control apparatus MCC detached from the bus B, all of the individual control part 4 (including exclusive control information 4A held in the exclusive control information holding unit 42) formed until then disappears.

On the other hand, in the (original) slave control apparatus SCC remaining in the bus B after the master control apparatus MCC is detached, although the control apparatus CC functioned as the master control apparatus MCC until then is detached, the same exclusive control information 4A as that held in the detached master control apparatus MCC is already also held in the (original) slave control apparatus SCC. Consequently, the function of the control apparatus CC is continuously displayed by using the held exclusive control information 4A.

Since the number of the control apparatus CC connected to the bus B becomes only one, the (original) slave control apparatus SCC displays the function of the master control apparatus MCC.

(II-ii) Embodiment in the Case where Control Apparatus CC is Newly Connected to Bus B Next, processes performed in the case where the master control apparatus MCC shown in FIG. 8A is detached from the bus B and, after that, re-connected to the bus B will be described by referring to FIG. 8B.

In the case where the control apparatus CC having apparatus identification information to become the master control apparatus MCC is newly connected to the bus B, a plurality of control apparatuses CC exist on the same bus B. Therefore, the process for making any of the control apparatuses CC as the master control apparatus MCC is executed. Concretely, the process is performed as follows. At the time the control apparatus CC to become the master control apparatus MCC is newly connected to the bus B, the value of the apparatus identification information is recognized in each of all of the control apparatuses CC including the connected control apparatus CC. By comparing the recognized values, each of the control apparatuses CC determines to become the master control apparatus MCC or the slave control apparatus SCC, and makes the setting by itself.

It is assumed that, by the above processes, in the case shown in FIG. 8B, the left control apparatus CC newly connected is set as the master control apparatus MCC in each of the control apparatuses CC, and the right control apparatus CC is set as the slave control apparatus SCC in each of the control apparatuses CC.

In the control apparatus CC which newly became the master control apparatus MCC, by the method described in the first embodiment, the individual control parts 4 corresponding to all of the apparatuses C to be controlled which are connected to the bus B at present are generated in the master control apparatus MCC.

The exclusive control information 4A which has been valid in the bus system S until then and is held in each of the individual control parts 4A of the control apparatuses CC which newly became the slave control apparatuses SCC has to be taken in the new master control apparatus MCC.

Consequently, in the bus system S of the second embodiment, an acquisition request for transmitting the exclusive control information 4A held until then in the control apparatuses CC to the new master control apparatus MCC via the bus B is sent from the managing unit 3 in the master control apparatus MCC to the managing units 3 in the other control apparatuses CC (step S91). The managing unit 3 in the slave control apparatus SCC which receives the request reads the exclusive control information 4A held in all of the individual control parts 4 in the slave control apparatus SCC (step S92). In response to the request, the individual control parts 4 read the exclusive control information 4A held by themselves and transmit it to the new master control apparatus MCC via the bus B (step S95).

The exclusive control information setting unit 34 in the managing unit 3 of the master control apparatus MCC which has received the exclusive control information 4A sets the obtained exclusive control information 4A in the individual control parts 4 (step S96), thereby performing operation preparation in the bus control apparatus MCC.

Next, processes performed when the master control apparatus MCC described with reference to FIG. 8B is newly connected will be mentioned in time sequence by using FIG. 9. FIG. 9 is a flowchart showing processes in time sequence from top to bottom, which are performed when the master control apparatus MCC shown in FIG. 8B is newly connected. In FIG. 9, step numbers similar to those in FIG. 8B are given to processes similar to those shown in FIG. 8B, and their detailed description will not be repeated.

As shown in FIG. 9, when the master control apparatus MCC is newly connected to the bus B, the managing unit 3 included in the master control apparatus MCC performs a process of inhibiting other request operations until the processes accompanying the new connection complete (step S90). After the inhibiting process is executed, even when any request operation for the present master control apparatus MCC is executed in the master control apparatus MCC, the process for the operation is stopped until the present process is completed or a message indicating that the operation is invalid is displayed, for example, in the output unit 6 or the like in the master control apparatus MCC.

After completion of the inhibiting process in step S90, the managing unit 3 generates a request to send the exclusive control information 4A presently held in the slave control apparatus SCC to the master control apparatus MCC, to the managing unit 3 in the slave control apparatus SCC (step S91). The managing unit 3 in the slave apparatus SCC which receives the request generates a request to read the exclusive control information 4A held in the individual control parts 4 in the slave control apparatus SCC, to all of the individual control parts 4 (step S92). In response to the request, the individual control parts 4 read the exclusive control information 4A held by themselves (step S93) and transmit it to the managing unit 3 (step S94).

The managing unit 3 which receives the exclusive control information 4A from the individual control parts 4 transmits it to the managing unit 3 in the master control apparatus MCC via the bus B (step S95).

The managing unit 3 which receives the exclusive control information 4A sends a request to hold the received exclusive control information 4A to the individual control parts 4 in the master control apparatus MCC (step S96). Each of the individual control parts 4 performs a process of storing the exclusive control information 4 corresponding to the request (step S97), and a response indicating that the storing process or the like is performed successfully is sent to the managing unit 3 (step S98).

After that, the process of inhibiting the other request operations executed in the managing unit 3 in the master control apparatus MCC (step S90) is cancelled (step S99), and the series of processes for acquiring the exclusive control information 4A accompanying new connection of the master control apparatus MCC is completed.

Hereinafter, in a manner similar to the first embodiment, the control right on each of the apparatuses C to be controlled is transmitted/received among the control apparatuses CC, thereby realizing exclusive control on each of the apparatuses C to be controlled.

As described above, by the operations of the bus system S according to the second embodiment, in addition to the effects produced by the operations of the bus system S according to the first embodiment, the connection state between the apparatus C to be controlled and the bus B is monitored. When the connection state changes, the exclusive control information 4A is updated according to the changed connection state. Therefore, the exclusive control on the apparatus C to be controlled can be executed reliably in accordance with the latest connection state.

When the control apparatus CC which has functioned as the master control apparatus MCC until then drops from the bus B, a new master control apparatus MCC is set by changing the setting of any of the slave control apparatuses SCC. Thus, the relation between the apparatus C to be controlled and the control apparatus CC in the bus system S can be maintained without any contradiction.

Further, when a new control apparatus CC is connected, a new master control apparatus MCC is set on the basis of the apparatus identification information of the control apparatus CC, and the exclusive control information 4A is taken over from the master control apparatus MCC functioned until then. Consequently, even when a newly connected control apparatus CC becomes the master control apparatus MCC, it can control the apparatuses C to be controlled without contradiction in relation with the other control apparatuses CC.

(III) Modifications

Modifications of the present invention will be described.

As a first modification, the unit of setting the exclusive control information in the configuration of the first or second embodiment is not limited to the entire apparatus C to be controlled but may be a sub unit (for example, a hard disk drive in an optical disk recorder, an optical disk recorder, or a broadcast reception tuner) in the apparatus C to be controlled, or a function element in the apparatus C to be controlled such as a logical plug unit for transmitting/receiving a broadcast stream.

In this case, by setting the unit of setting the exclusive control right to a function element, the control rights of functions which are not being used can be released to the other control apparatuses CC. It enables a user to request and execute recording of a broadcast program via a bus while another user is viewing information recorded on an optical disk.

As a second modification, an attribute of priority to other control apparatuses CC may be set in a control right setting requester (control apparatus CC) having an identifier for identifying the user or the like to which the control right is given. By setting the attribute indicative of the level (high or low) of priority in the control apparatus CC itself, even if the control right is set exclusively in the individual control part 4, when a control right acquisition request is generated from a control apparatus CC having higher priority, the control apparatus CC having higher priority can forcedly acquire the control right.

Therefore, exclusive operation control on the apparatus C to be controlled according to applications can be realized. Specifically, for example, by giving high priority to a function of executing programmed recording or a function of receiving urgent broadcast and showing it to the user, an effect is obtained such that important process can be executed with reliability.

As a third modification, in addition to the case where the apparatus C to be controlled and the control apparatus CC are connected to the same bus B, for example, a control apparatus CC connected to another bus may be connected via a so-called bridge device, and receive a control right acquisition request and a control command issue request from the user or the like to the apparatus C to be controlled in the control apparatus CC. In this case, the individual control part 4 corresponding to the apparatus C to be controlled is not formed in the control apparatus CC connected to another bus. Consequently, the managing unit 3 which receives the request transfers it to the managing unit 3 in the control apparatus CC connected to the same bus to which the apparatus C to be controlled is also connected, thereby realizing remote operation control between the buses.

With the configuration, for example, in a network in a house, it is unrealistic to connect apparatuses in a plurality of rooms by a single bus B due to the limitations of the cable length and the bandwidth, but a method may be considered in which a bus B is constructed in each of the rooms and the plurality of buses B are connected by a bridge device. With the configurations of the foregoing embodiments, the operation of the apparatus CC to be controlled in a room can be controlled from another room. Therefore, the operation of the apparatus C to be controlled can be exclusively controlled also from a control apparatus CC connected to the different bus B.

Finally, as a fourth modification, the present invention can be applied to the case where the apparatus C to be controlled and the control apparatus CC are connected to the same bus B, in addition, a control apparatus connected to another network performing communication in accordance with another protocol is connected via a bridge device or a router, and the control apparatus controls the operation of the apparatus C to be controlled which is connected to the bus B in the embodiments. In this case, the individual control part 4 corresponding to the apparatus C to be controlled is not formed in the control apparatus connected to another kind of network. Consequently, the managing unit 3 which receives a request from a control apparatus on the another network transfers it to the managing unit 3 in the control apparatus CC connected to the same bus B to which the apparatus C to be controlled is also connected, thereby realizing the control.

In this case, the operation of the apparatus C to be controlled which is connected to the bus B can be controlled exclusively also from the control apparatus connected to a network other than the bus in the foregoing embodiments.

Further, by recording a program corresponding to the flowcharts shown in FIG. 2, 3A, 4, 6, 7, or 9 in an information recording medium such as a flexible disk, a semiconductor memory, or a hard disk or by obtaining the program via the Internet or the like and recording it, and reading and executing the program by a general computer, the computer can be utilized as the managing unit 3 or the individual control part 4 in the embodiments.

The invention claimed is:

1. A network system including one or more apparatuses to be controlled and one or more control apparatuses, at the time of controlling operation of any of the apparatuses to be controlled from any of the control apparatuses, the operation being controlled in such a manner that the apparatus to be controlled whose operation is controlled and the control apparatus for controlling the operation are associated one-to-one while excluding the other control apparatuses,
 the control apparatus included in the network comprising an exclusive control information storing device which stores, for each of the apparatuses to be controlled, exclusive control information indicating correspondence between operation of each of the apparatuses to be controlled and a control apparatus which controls the operation, and
 the control apparatus being for controlling the operation in any of the apparatuses to be controlled on the basis of the stored exclusive control information,
 wherein one of the control apparatuses included in the network system is set as a master control apparatus, and the master control apparatus comprises:
 a first updating device, when request information indicative of a request to make the master control apparatus control the operation of any of the apparatuses to be controlled included in the network system is entered, which updates the exclusive control information stored in the master control apparatus in correspondence with the apparatus to be controlled which is shown in the request information to information indicating that the master control apparatus exclusively controls the operation of the apparatus to be controlled which is shown in the request information; and
 a second updating device, when the request information is entered, which outputs update request information to slave control apparatuses, the slave control apparatuses being the control apparatuses other than the master control apparatus, the update request information being for updating the exclusive control information stored in the slave control apparatuses in correspondence with the apparatus to be controlled which is shown in the request information to information indicating that the master control apparatus exclusively controls the operation of the apparatus to be controlled which is shown in the request information,
 wherein at least one of the slave control apparatuses comprises:
 an updating device that, only when the update request information is entered from the master control apparatus, updates the exclusive control information stored in the slave control apparatus in correspondence with the apparatus to be controlled which is indicated by the request information to information indicating that the master control apparatus exclusively controls the operation of the apparatus to be controlled indicated by the request information on the basis of the update request information,
 a third updating device that, when second request information indicative of a request to make the slave control apparatus controls the operation of any of the apparatuses to be controlled included in the network system is entered, updates the exclusive control information stored in the master control apparatus to information indicating that the slave control apparatus exclusively controls the operation of the apparatus to be controlled indicated by the second request information in correspondence with the apparatus to be controlled indicated by the second request information; and
 wherein the second updating device of the master control apparatus, when the second request information is entered to the slave control apparatus and the exclusive control information stored in the master control apparatus in correspondence with the apparatus to be controlled which is shown in the second request information is updated, outputs the update request information to the slave control apparatus, the update request information being for updating the exclusive control information stored in the slave control apparatus in correspondence with the apparatus to be controlled which is shown in the second request information to information indicating that the slave control apparatus exclusively controls the operation of the apparatus to be controlled which is shown in the second request information; and
 wherein the updating device of the slave control apparatus, when the update request information is entered from the master control apparatus, updates the exclusive control information stored in the slave control apparatus in correspondence with the apparatus to be controlled which is indicated by the second request information to information indicating that the slave control apparatus exclusively controls the operation of the apparatus to be controlled indicated by the second request information only on the basis of the update request information.

2. The network system according to claim 1,
 wherein all of the exclusive control information corresponding to all of the apparatuses to be controlled is stored in the exclusive control information storing device included in each of the control apparatuses.

3. The network system according to claim 1, wherein the control apparatus comprises:
   a monitoring device which monitors a connection state between the apparatus to be controlled and the network system; and
   an updating device, when the connection state changes, which updates each of the exclusive control information in accordance with the changed connection state.

4. The network system according to claim 1,
   wherein each of the exclusive control information has identification information for identifying the control apparatus storing the exclusive control information from the other control apparatuses, and
   the system further comprises a setting device which sets one of the control apparatuses as the master control apparatus on the basis of the identification information.

5. The network system according to claim 1,
   wherein when connection between the master control apparatus and the network system is interrupted, any of the slave control apparatuses is set as a new master control apparatus, and
   the new master control apparatus comprises the first updating device and the second updating device.

6. The network system according to claim 4,
   wherein when a new control apparatus is connected to the network system, the setting device determines whether the newly connected control apparatus is to become the master control apparatus or not on the basis of the identification information stored in the newly connected control apparatus and,
   when the newly connected control apparatus functions as the master control apparatus, the new master control apparatus comprises obtaining device which obtains the exclusive control information from any of the other control apparatuses.

7. An information recording medium where a program for making a computer function as a master control apparatus according to claim 1 is recorded so that it can be read by the computer.

8. A control method executed by a network system including one or more apparatuses to be controlled and one or more control apparatuses, at the time of controlling operation of any of the apparatuses to be controlled from any of the control apparatuses, the operation being controlled in such a manner that the apparatus to be controlled whose operation is controlled and the control apparatus for controlling the operation are associated one-to-one while excluding the other control apparatuses,
   the control method comprising:
   a storing process of storing exclusive control information indicating correspondence between operation of each of the apparatuses to be controlled and a control apparatus which controls the operation, into exclusive control information storing device in each of the control apparatuses; and
   an operation control process of controlling the operation in any of the apparatuses to be controlled on the basis of the stored exclusive control information;
   wherein the control method executed by a master control apparatus as any one of the control apparatuses included in the network system comprises:
   a first updating process, when request information indicative of a request to make the master control apparatus control the operation of any of the apparatuses to be controlled included in the network system is entered, of updating the exclusive control information stored in the master control apparatus in correspondence with the apparatus to be controlled which is shown in the request information to information indicating that the master control apparatus exclusively controls the operation of the apparatus to be controlled which is shown in the request information; and
   a second updating process, when the request information is entered, of outputting update request information to slave control apparatuses, the slave control apparatuses being the control apparatuses other than the master control apparatus, the update request information being for updating the exclusive control information stored in the slave control apparatuses in correspondence with the apparatus to be controlled which is shown in the request information to information indicating that the master control apparatus exclusively controls the operation of the apparatus to be controlled which is shown in the request information,
   wherein the control method executed by at least one of the slave control apparatuses comprises:
   an updating process, only when the update request information is entered from the master control apparatus, of updating the exclusive control information stored in the slave control apparatus in correspondence with the apparatus to be controlled which is indicated by the request information to information indicating that the master control apparatus exclusively controls the operation of the apparatus to be controlled indicated by the request information on the basis of the update request information,
   a third updating process, when second request information indicative of a request to make the slave control apparatus control the operation of any of the apparatuses to be controlled included in the network system is entered, of updating the exclusive control information stored in the master control apparatus to information indicating that the slave control apparatus exclusively controls the operation of the apparatus to be controlled indicated by the second request information in correspondence with the apparatus to be controlled indicated by the second request information; and
   wherein the second updating process of the method executed by the master control apparatus, when the second request information is entered to the slave control apparatus and the exclusive control information stored in the master control apparatus in correspondence with the apparatus to be controlled which is shown in the second request information is updated, of outputting the update request information to the slave control apparatus, the update request information being for updating the exclusive control information stored in the slave control apparatus in correspondence with the apparatus to be controlled which is shown in the second request information to information indicating that the slave control apparatus exclusively controls the operation of the apparatus to be controlled which is shown in the second request information; and
   wherein the updating process of the method executed by the slave control apparatus, when the update request information is entered from the master control apparatus, of updating the exclusive control information stored in the slave control apparatus in correspondence with the apparatus to be controlled which is indicated by the second request information to information indicating that the slave control apparatus exclusively controls the operation of the apparatus to be controlled indicated by the second request information on the basis of the update request information.

* * * * *